(12) United States Patent
Standard et al.

(10) Patent No.: US 11,034,564 B2
(45) Date of Patent: Jun. 15, 2021

(54) SYSTEMS AND METHODS FOR A MATERIAL HANDLING VEHICLE WITH A MODULAR FRAME

(71) Applicant: The Raymond Corporation, Greene, NY (US)

(72) Inventors: Adam Wayne Standard, Johnson City, NY (US); Robert Paul Mclachlan, Walton, NY (US); Joseph Thomas Yahner, Chenago, NY (US)

(73) Assignee: The Raymond Corporation, Greene, NY (US)

( * ) Notice: Subject to any disclaimer, the term of this patent is extended or adjusted under 35 U.S.C. 154(b) by 310 days.

(21) Appl. No.: 16/209,595

(22) Filed: Dec. 4, 2018

(65) Prior Publication Data

US 2019/0169007 A1 Jun. 6, 2019

Related U.S. Application Data

(60) Provisional application No. 62/594,771, filed on Dec. 5, 2017.

(51) Int. Cl.
*B66F 9/075* (2006.01)
*B66F 9/18* (2006.01)
(Continued)

(52) U.S. Cl.
CPC ............ *B66F 9/07504* (2013.01); *B62B 3/02* (2013.01); *B62B 3/0612* (2013.01);
(Continued)

(58) Field of Classification Search
CPC .... B66F 9/07504; B66F 9/07513; B66F 9/12; B66F 9/18
See application file for complete search history.

(56) References Cited

U.S. PATENT DOCUMENTS

| 3,756,350 A | 9/1973 | Gandolfo |
| 3,948,356 A | 4/1976 | Keene |

(Continued)

FOREIGN PATENT DOCUMENTS

| AU | 2017201244 A1 | 7/2017 |
| CN | 203612903 U | 5/2014 |

(Continued)

OTHER PUBLICATIONS

European Patent Office, Extended European Search Report for application 18210303.6, dated Apr. 30, 2019.

*Primary Examiner* — Diem M Tran
(74) *Attorney, Agent, or Firm* — Quarles & Brady LLP (57) ABSTRACT

Some aspects of the present disclosure provide a modular vehicle frame for a material handling vehicle. In some configurations, the modular vehicle frame includes a battery compartment, a handle configured to control a speed and direction of a traction wheel, and a mounting assembly configured to selectively quick-connect to a material handling attachment. In some configurations, the mounting assembly includes a mounting plate having a first side and a second side, at least one pivot block extending from the first side of the mounting plate and configured to provide a pivotal interface with the material handling attachment, and at least one locking latch attached to the second side of the mounting plate and configured to provide a selective locking interface with the material handling attachment.

26 Claims, 10 Drawing Sheets

(51) Int. Cl.
    *B62B 3/02*     (2006.01)
    *B66F 9/12*     (2006.01)
    *B62B 3/06*     (2006.01)
    *B62B 5/00*     (2006.01)
    *B66F 9/06*     (2006.01)

(52) U.S. Cl.
    CPC ........ *B62B 5/0053* (2013.01); *B66F 9/07513* (2013.01); *B66F 9/07531* (2013.01); *B66F 9/07559* (2013.01); *B66F 9/12* (2013.01); *B66F 9/18* (2013.01); *B62B 2206/006* (2013.01); *B66F 9/061* (2013.01)

(56) References Cited

U.S. PATENT DOCUMENTS

| | | |
|---|---|---|
| 4,177,001 A | 12/1979 | Blackwood |
| 4,482,286 A | 11/1984 | Farmer |
| 4,619,579 A | 10/1986 | Frison |
| 5,064,338 A | 11/1991 | Lawrence |
| 5,281,076 A | 1/1994 | Lehman |
| 5,419,673 A | 5/1995 | Merhar |
| 5,560,129 A | 10/1996 | Rothbart |
| 5,582,502 A | 12/1996 | Henn |
| 5,674,046 A | 10/1997 | Meyer |
| 6,102,131 A | 8/2000 | Malinowski |
| 6,931,770 B2 | 8/2005 | Belzile |
| 7,484,921 B2 | 2/2009 | Murphy |
| 7,669,828 B2 | 3/2010 | Hardy |
| D623,820 S | 9/2010 | Masalin |
| 9,139,405 B2 * | 9/2015 | Balcom .............. B66F 9/12 |
| 9,505,383 B2 | 11/2016 | Peel |
| 9,630,667 B2 | 4/2017 | Cunagin |
| 10,353,386 B2 * | 7/2019 | Wetegrove ............ G05D 1/021 |
| 10,730,728 B1 * | 8/2020 | Qichen .................... B66F 9/24 |
| 2005/0246078 A1 | 11/2005 | Vercammen |
| 2006/0245891 A1 | 11/2006 | Flaherty |
| 2008/0175700 A1 | 7/2008 | McGrane |
| 2016/0090286 A1 * | 3/2016 | Belotti ................... B66F 9/165 |
| | | 414/607 |
| 2017/0334696 A1 | 11/2017 | Otto |
| 2019/0243353 A1 * | 8/2019 | Daimer ............... G05D 1/0016 |
| 2019/0351927 A1 * | 11/2019 | Yahner .................. B66F 9/082 |

FOREIGN PATENT DOCUMENTS

| | | | |
|---|---|---|---|
| CN | 105366594 | 3/2016 | |
| DE | 102018109554 A1 * | 2/2019 | |
| DE | 3560885 A1 * | 10/2019 | |
| EP | 1731477 A2 | 12/2006 | |
| EP | 2998265 B1 * | 8/2017 | ............... B66F 9/08 |
| GB | 1462688 A * | 1/1977 | |
| WO | 2007014421 A1 | 2/2007 | |

* cited by examiner

FIG. 10

SYSTEMS AND METHODS FOR A MATERIAL HANDLING VEHICLE WITH A MODULAR FRAME

CROSS-REFERENCES TO RELATED APPLICATIONS

The present application is based on, claims priority to, and incorporates herein by reference in its entirety U.S. Provisional Patent Application No. 62/594,771, filed on Dec. 5, 2017, and entitled "Systems and Methods for a Material Handling Vehicle with a Modular Frame."

STATEMENT REGARDING FEDERALLY SPONSORED RESEARCH

Not Applicable.

BACKGROUND

Conventional warehouses typically employ the use of material handling vehicles to carry out various tasks. The various tasks performed within the warehouse requires a fleet of different material handling vehicles to be maintained within the warehouse. For example, a warehouse may require one vehicle for moving loads at floor level, one vehicle for putting loads away on a rack or conveyer, and another vehicle for towing carts. Thus, conventional warehouse applications may be required to operate and maintain a number of different types of material handling vehicles, which adds cost and complexity to the operations of the warehouse.

BRIEF SUMMARY

The present disclosure relates generally to material handling vehicles and, more specifically, to a material handling vehicle that includes a modular frame configured to selectively quick-connect to one of a plurality of material handling attachments. In this way, for example, a warehouse may perform multiple tasks with a single material handling vehicle frame, thereby reducing the number of individual vehicles required in a fleet.

In one aspect, the present disclosure provides a modular vehicle frame for a material handling vehicle. The modular vehicle frame includes a battery compartment, a handle configured to control a speed and direction of a traction wheel, and a mounting assembly configured to selectively quick-connect to a material handling attachment. The mounting assembly includes a mounting plate having a first side and a second side, at least one pivot block extending from the first side of the mounting plate and configured to provide a pivotal interface with the material handling attachment, and at least one locking latch attached to the second side of the mounting plate and configured to provide a selective locking interface with the material handling attachment.

In one aspect, the present disclosure provides a material handling vehicle that includes a modular vehicle frame. The modular vehicle frame includes a battery compartment, a handle configured to control a speed and direction of a traction wheel, and a mounting assembly configured to selectively quick-connect to a material handling attachment. The material handling vehicle further includes a material handling attachment having an attachment assembly configured to selectively quick-connect to the mounting assembly of the modular vehicle frame.

In one aspect, the present disclosure provides a material handling vehicle that includes a traction wheel, and a handle removably coupled to the material handling vehicle and configured to control a speed and direction of a traction wheel.

In one aspect, the present disclosure provides an attachment kit for selectively quick-connecting a material handling attachment to a modular vehicle frame. The kit includes a mounting assembly configured to be arranged on the modular vehicle frame. The mounting assembly includes a mounting plate having a first side and a second side, at least one pivot block extending from the first side of the mounting plate and configured to provide a pivotal interface with the material handling attachment, and at least one locking latch attached to the second side of the mounting plate and configured to provide a selective locking interface with the material handling attachment. The kit further includes an attachment assembly configured to be arranged on the material handling attachment. The attachment assembly includes an attachment plate having a first side and a second side, at least one pivot bar configured to pivotally interact with the at least one pivot block, and at least one hook configured to interact with the at least one locking latch.

In one aspect, the present disclosure provides an autonomously guided material handling vehicle that includes a battery compartment, and a mounting assembly attached to a back end of the battery compartment and configured to selectively quick-connect to a material handling attachment. The mounting assembly includes a mounting plate having a first side and a second side, at least one pivot block extending from the first side of the mounting plate and configured to provide a pivotal interface with the material handling attachment, and at least one locking latch attached to the second side of the mounting plate and configured to provide a selective locking interface with the material handling attachment.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Before any aspects of the invention are explained in detail, it is to be understood that the invention is not limited in its application to the details of construction and the arrangement of components set forth in the following description or illustrated in the following drawings. The invention is capable of other aspects and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use aspects of the invention. Various modifications to the illustrated aspects will be readily apparent to those skilled in the art, and the generic principles herein can be applied to other aspects and applications without departing from aspects of the invention. Thus, aspects of the invention are not intended to be limited to aspects shown, but are to be accorded the widest scope consistent with the principles and features disclosed herein. The following detailed description is to be read with reference to the figures, in which like elements in different figures have like reference numerals. The figures, which are not necessarily to scale, depict selected aspects and are not intended to limit the scope of aspects of the invention. Skilled artisans will recognize the examples provided herein have many useful alternatives and fall within the scope of aspects of the invention.

It is to be appreciated that material handling vehicles are designed in a variety of configurations to perform a variety of tasks. The various configurations of material handling vehicles described herein are shown by way of example. It will be apparent to those of skill in the art that the present invention is not limited to vehicles of these types, and can also be provided in various other types of material handling vehicle configurations, including for example, orderpickers, swing reach vehicles, and any other lift vehicles. The various aspects disclosed herein are suitable for both driver controlled, pedestrian controlled, remotely controlled, and autonomously controlled material handling vehicles.

Generally, the present disclosure provides a modular vehicle frame for a material handling vehicle that facilitates the quick-connection to one of a plurality of material handling attachments that may be designed for use with the modular vehicle frame. In this regard, some aspects of the present disclosure provide a modular vehicle frame having at least one pivotal interface and at least one selective locking interface that facilitate the quick-connection to a material handling attachment. In this way, for example, the modular vehicle frame is configurable as a multi-use material handling vehicle via a selective quick-connection to one of a plurality of material handling attachments, which negates the need for a warehouse application to maintain a number of different material handling vehicles thereby saving cost and reducing complexity.

In some non-limiting applications, the modular vehicle frame may be designed with or without an operator compartment. For example, the modular vehicle frame may be designed without an operator compartment and configured to operate as an autonomously guided vehicle (AGV). In some non-limiting examples, without an operator compartment, the modular vehicle frame may not be provided with manual controls, etc., and instead be provided with a removable handle that can be used to remotely train routes for the AGV or a fleet of AGVs. Thus, the modular vehicle frame may be configurable into a manually or operator driven material handling vehicle or an AGV.

Figure 1:
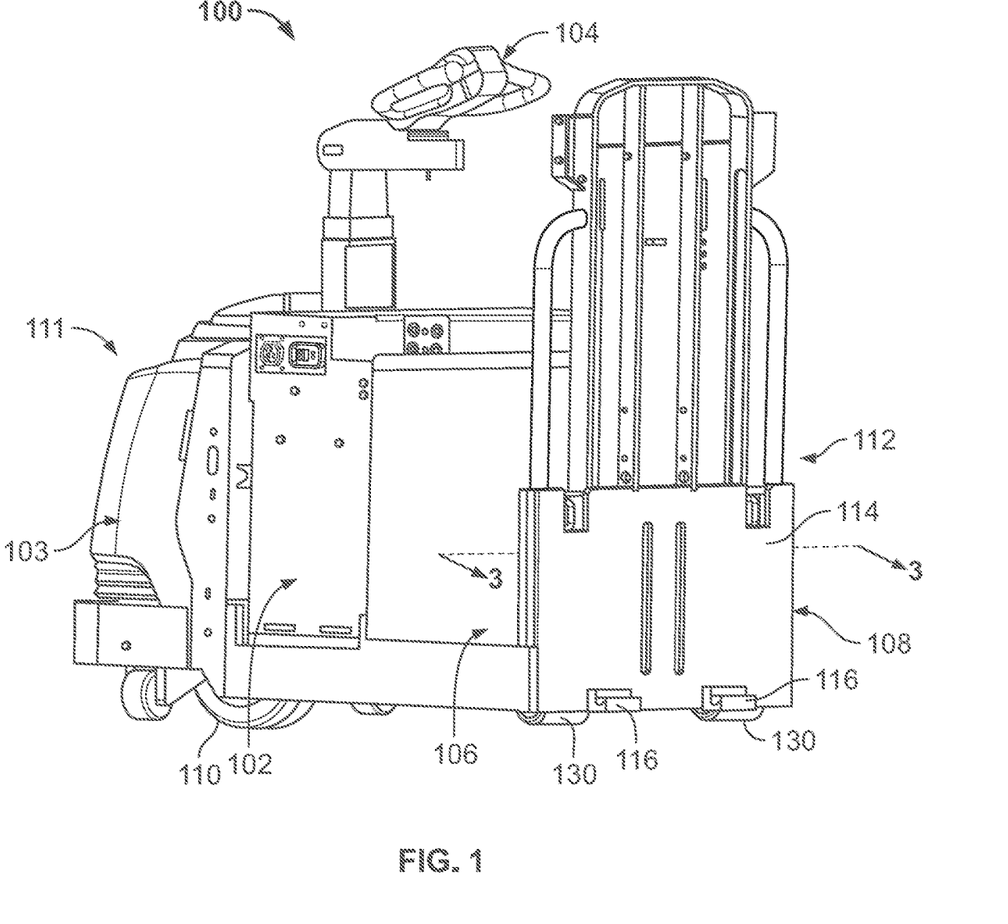
FIG. 1 is a top, back, left isometric view of a modular vehicle frame according to one aspect of the present disclosure.

FIG. 1 illustrates one non-limiting example of a modular vehicle frame 100 according to the present disclosure. The modular vehicle frame 100 includes a battery compartment 102, a power section 103, a handle 104, an operator compartment 106, and a mounting assembly 108. The battery compartment 102 may house a battery (not shown) configured to supply power to various components of the modular vehicle frame 100. For example, the battery may supply power to a motor (not shown) and/or a transmission (not shown) that are arranged within the power section 103 and configured to drive a traction wheel 110. In the illustrated non-limiting example, the traction wheel 110 is arranged under the power section 103. In other non-limiting examples, the traction wheel 110 may be arranged in another location under the modular vehicle frame 100.

The handle 104 may be configured to allow an operator to control a speed and direction of travel of the modular vehicle frame 100, among other things. In some non-limiting examples, the handle 104 may be configured to manually steer and power the traction wheel 110. In some non-limiting examples, the handle 104 may be removably coupled to a front end 111 of the modular vehicle frame 100 to enable an operator to remotely (i.e., from outside of the modular vehicle frame 100) train the modular vehicle frame 100 for operation as an AGV. That is, the handle 104 may perform functions to both control the operation of the modular vehicle frame 100 whether connected to or disconnected from the modular vehicle frame 100. In this way, for example, the modular vehicle frame 100 may not require an additional component (e.g., a remote control separate from the handle 104) to remotely control the operations thereof, due to the removable handle 104 being capable of performing these functions.

In some non-limiting examples, the handle 104 may be removably connected to the modular vehicle frame 100 via a quick-disconnect (e.g., a pin and plug). In some non-limiting examples, the handle 104, once removed from the modular vehicle frame 100, may be configured to communicate wirelessly with a controller (not shown) on board the modular vehicle frame 100. Alternatively or additionally, the handle 104 may be configured to wirelessly communicate with a plurality of material handling vehicle, for example, via unique identifiers.

In the illustrated non-limiting example, the modular vehicle frame 100 includes the operator compartment 106 arranged between the battery compartment 102 and the mounting assembly 108. In other non-limiting examples, the modular vehicle frame 100 may be designed without the operator compartment 106 and the mounting assembly 108 may be arranged on a back end of the battery compartment 102.

Generally, the mounting assembly 108 may enable the modular vehicle frame 100 to selectively quick-connect to one of a plurality of material handling attachments. The mounting assembly 108 may be coupled to a back end 112 of the modular vehicle frame 100. In other non-limiting examples, the mounting assembly 108 may be coupled to, for example, a side of the modular vehicle frame 100.

Figure 2:
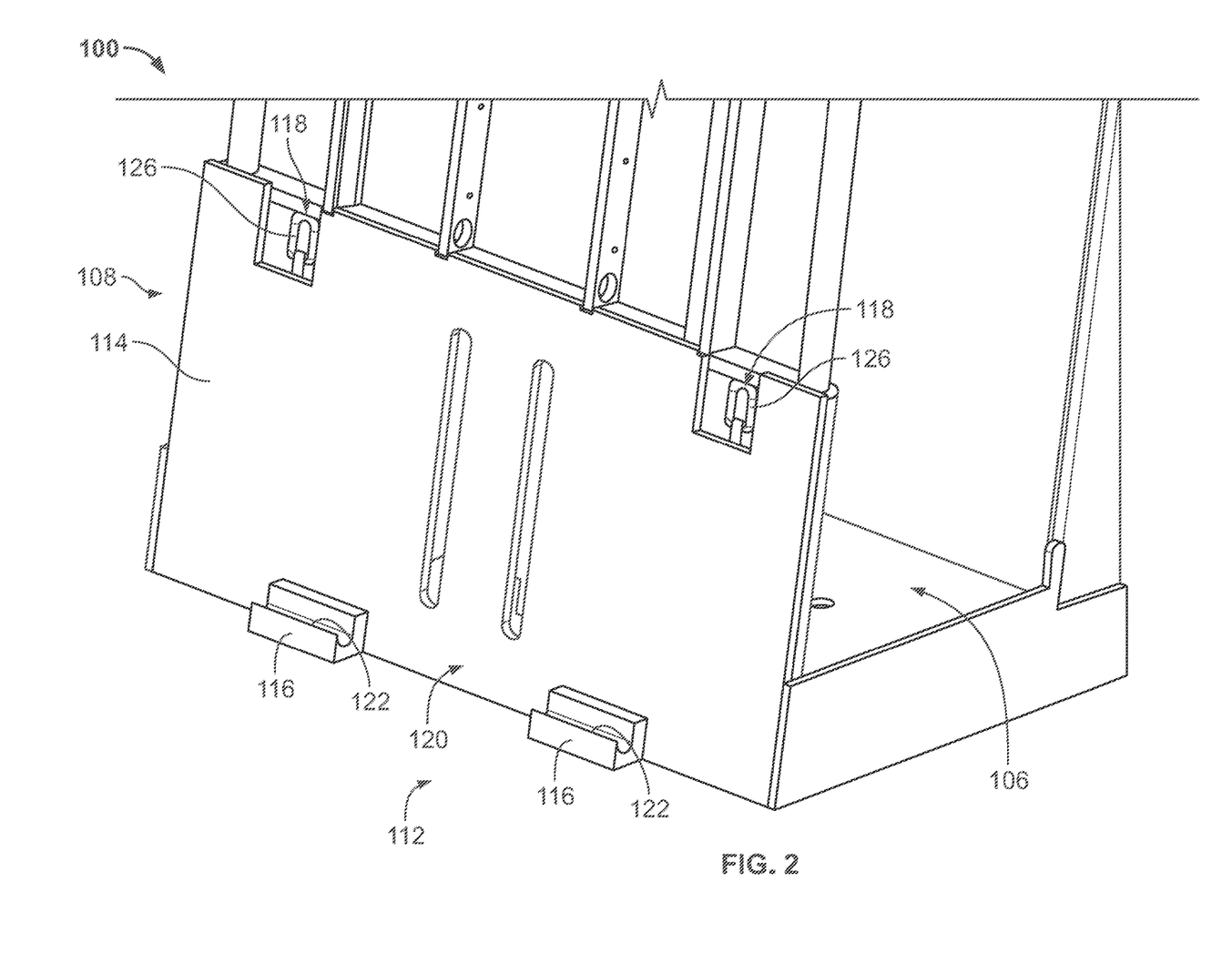
FIG. 2 is a partial top, back, right isometric view of the modular vehicle frame of FIG. 1.
Figure 3:
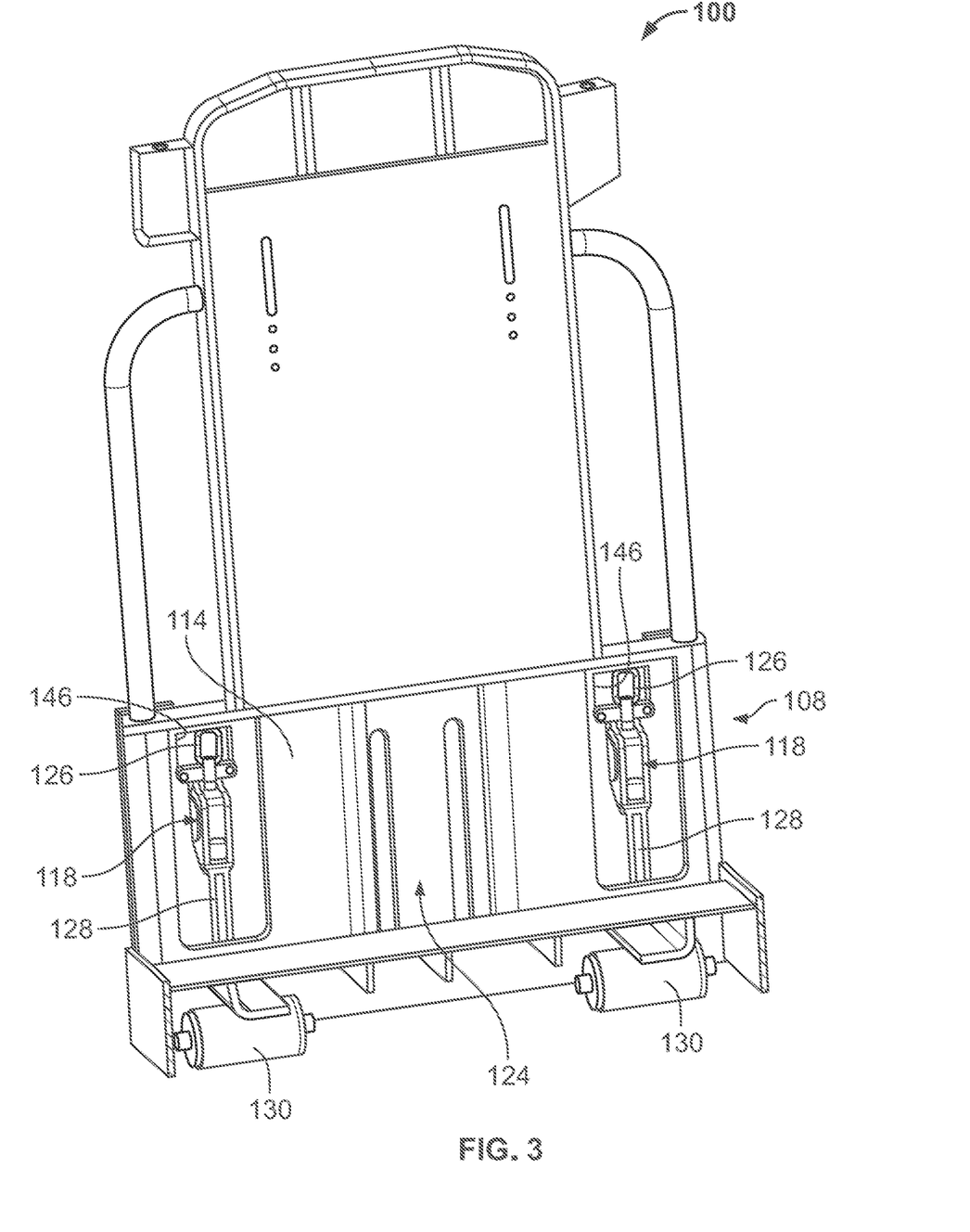
FIG. 3 is a cross-sectional view of a portion of the modular vehicle frame of FIG. 2 taken along line 3-3.

With reference to FIGS. 2 and 3, the mounting assembly 108 may include a mounting plate 114, one or more pivotal blocks 116, and one or more locking latches 118. In the illustrated non-limiting example, the mounting assembly 108 includes two pivotal blocks 116 arranged to extend from a bottom of a first side 120 of the mounting plate 114 in a direction away from the battery compartment 102. In some non-limiting examples, the mounting assembly 108 may include more or less than two pivotal blocks 116. The pivotal blocks 116 may be laterally spaced apart and may each include a concave top surface 122 that defines a generally rounded profile. Each of the concave top surfaces 122 is configured to pivotally receive a corresponding bar-like structure on a material handling attachment, as will be described herein.

In the illustrated non-limiting example, the mounting assembly 108 includes two locking latches 118 mounted to the top of a second side 124 of the mounting plate 114. The locking latches 118 may be laterally spaced apart and may each include a lock ring 126 and an arm 128. The lock rings 126 may be vertically adjustable to accommodate varying material handling attachment geometries and to vary a latching pressure applied in a locked state. In operation, the arms 128 may be selectively manipulated by an operator to transition the locking latches 118 between the locked state and an unlocked state. In some non-limiting examples, the locking latches 118 may be electronically, hydraulically, or electro-hydraulically controlled between the locked state and the unlocked state.

Generally, a material handling attachment configured to quick-connect to the modular vehicle frame 100 may include load wheels (i.e., wheels other than the traction wheel 110 configured to support a weight of the modular vehicle frame 100 and any additional load arranged thereon or on a material handling attachment). However, to enable the modular vehicle frame 100 to travel with no material handling attachment quick-connected thereto, one or more support wheels 130 may be provided, for example, under the mounting assembly 108. That is, the support wheels 130 may be configured to engage the ground and support the modular vehicle frame 100 when it is not quick-connected to a material handling attachment. In some non-limiting examples, the support wheels 130 may be raised above the ground when the modular vehicle frame 100 is quick-connected to a material handling attachment. In the illustrated non-limiting example, the modular vehicle frame 100 includes two support wheels 130 that are laterally spaced from one another. In some non-limiting examples, the modular vehicle frame 100 may include more or less than two support wheels 130. In still other non-limiting examples, load wheels may be integrated into the modular vehicle frame 100 instead of the material handling attachments.

Figure 4:
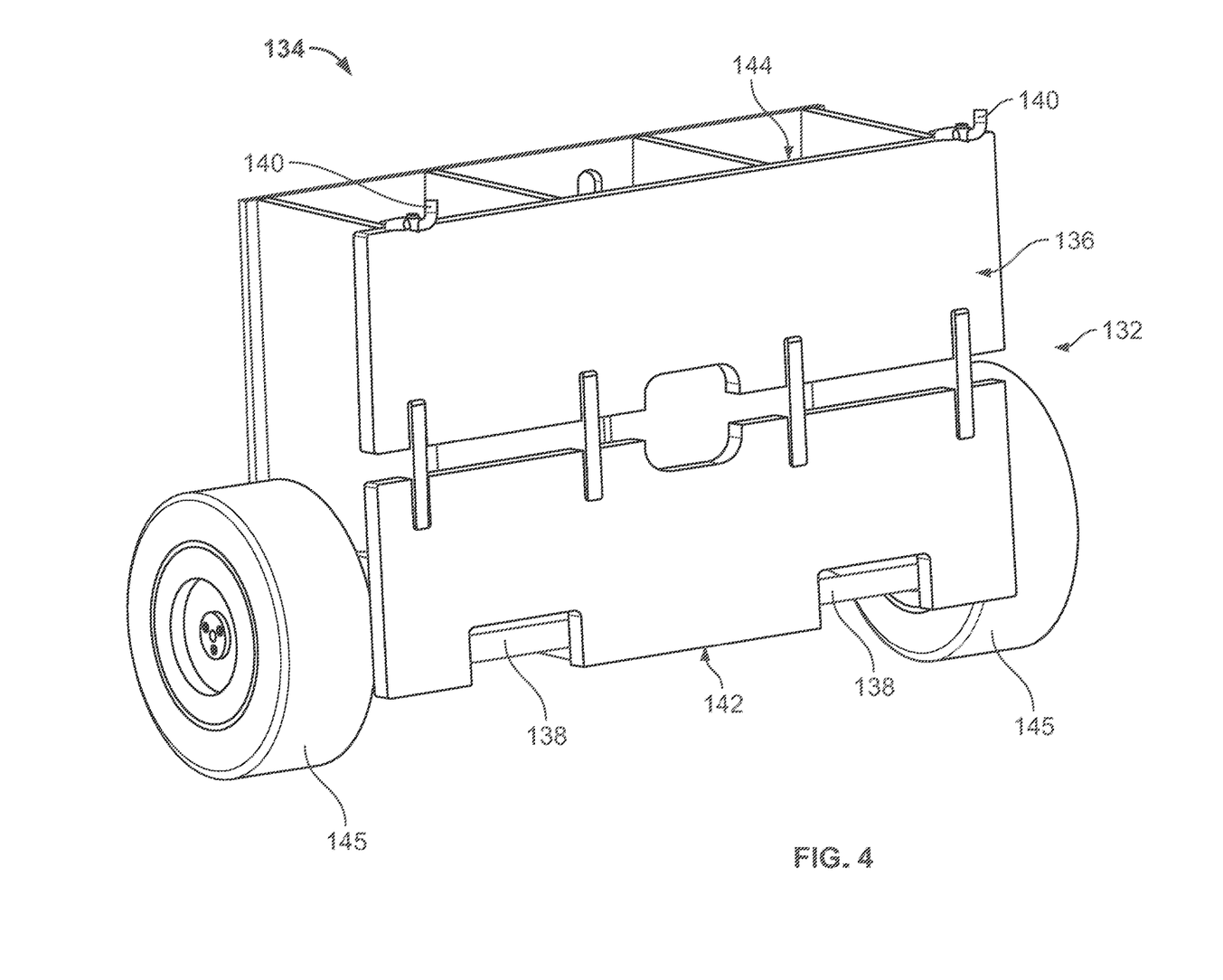
FIG. 4 is a top, front, right isometric view of an attachment mounting plate arranged on an attachment configured to selectively quick-connect to the modular frame of FIG. 1 according to one aspect of the present disclosure.

FIG. 4 illustrates one non-limiting example of an attachment assembly 132 that may be arranged on a material handling attachment 134 and configured to selectively quick-connect to the mounting assembly 108 of the modular vehicle frame 100. The attachment assembly 132 may include an attachment plate 136, one or more pivot bars 138, and one or more hooks 140. In the illustrated non-limiting example, the attachment assembly 132 includes two pivot bars 138 that are laterally spaced apart. The pivot bars 138 may be arranged adjacent to a bottom of a first side 142 of the attachment plate 136. The pivot bars 138 may be configured to interact with the pivot blocks 116 to provide a pivotal interface between the modular vehicle frame 100 and the material handling attachment 134, and to hold the material handling attachment 134 on modular vehicle frame 100.

In the illustrated non-limiting example, the attachment assembly 132 includes two hooks 140 that are laterally spaced apart. The hooks 140 may be arranged on a top side 144 of the attachment plate 136 and extend in a direction toward the first side 142 of the attachment plate 136. The hooks 140 may be configured to interact with the locking latches 118 to provide a selective locking interface between the modular vehicle frame 100 and the material handling attachment 134. For example, each of the hooks 140 may be configured to interact with a respective one of the lock rings 126 and the arms 128 may be selectively manipulated to apply a locking force between the modular vehicle frame 100 and the material handling attachment 134.

As described herein, one or more load wheels 145 may be integrated into the material handling attachment 134. In the illustrated non-limiting example, the material handling attachment 134 includes two load wheels 145 arranged on laterally opposing sides thereof.

In some non-limiting examples, the mounting assembly 108 and the attachment assembly 132 may be arranged in an attachment kit. The attachment kit may be used to adapt existing material handling vehicle frames into a modular vehicle frame capable of selectively quick-connecting to one of a plurality of different material handling attachments.

General operation of the quick-connect capabilities between the modular vehicle frame 100 and a material handling attachment (e.g., the material handling attachment 134) will be described with reference to FIGS. 5 and 6. Initially, the modular vehicle frame 100 may be driven, either manually or autonomously, into close proximity to a desired material handling attachment such that each of the pivot bars 138 is generally aligned over a corresponding one of the pivot blocks 116. The material handling attachment may be arranged such that each of the hooks 140 extends through a corresponding opening 146 on the mounting plate 114 and into a corresponding one of the lock rings 126 of the locking latches 118. With the hooks 140 arranged within the lock rings 126, the arms 128 may be transitioned from the unlocked state to the locked state, as illustrated in FIG. 6. As the locking latches 118 are locked (e.g., by pulling down on the arms 128 from the perspective of FIG. 6), the back end 112 of the modular vehicle frame 100 may be lifted up (from the perspective of FIG. 6) and each of the pivot bars 138 may be brought into engagement with a corresponding one of the concave top surfaces 122 of the pivot blocks 116.

Figure 5:
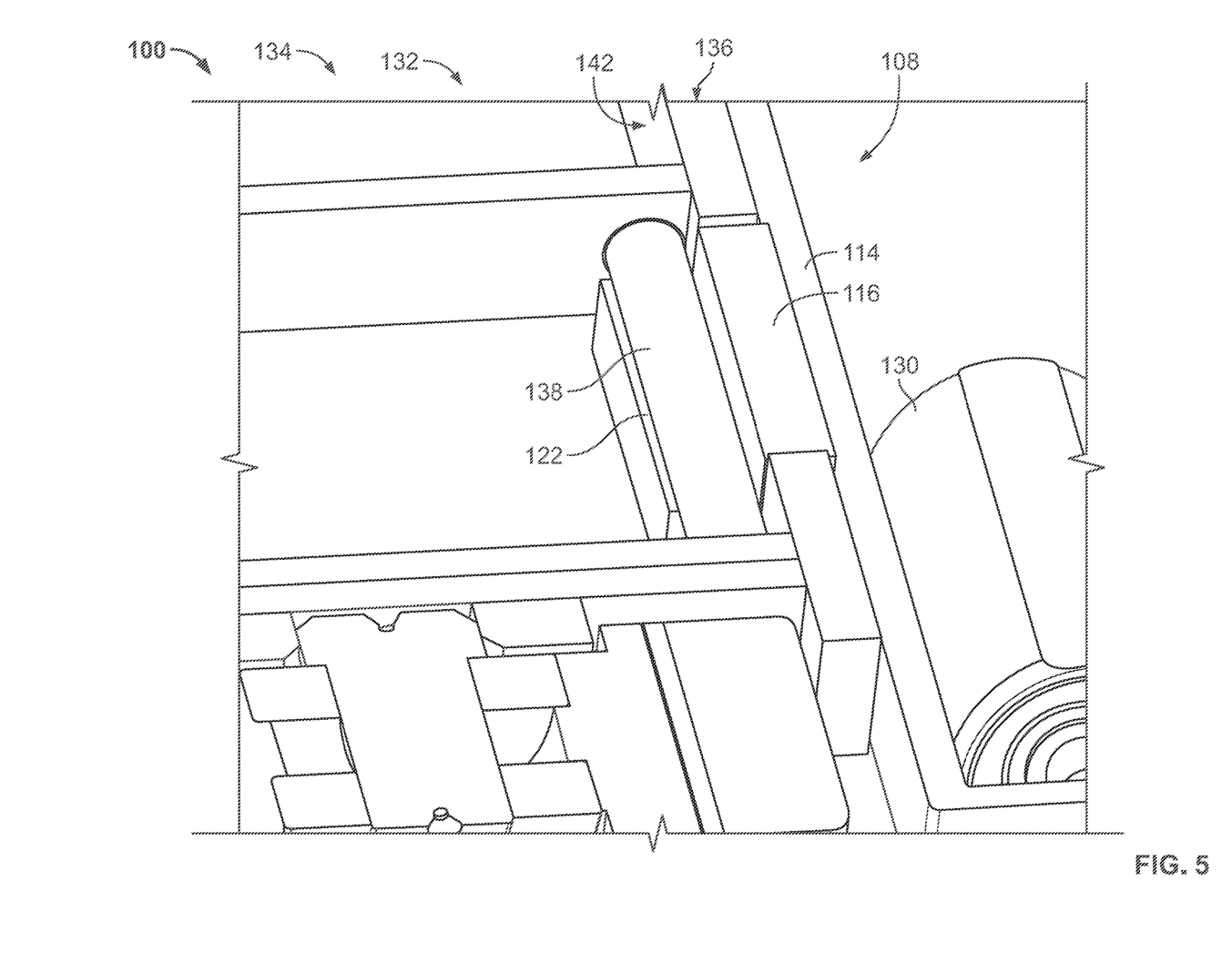
FIG. 5 is a top, back, right isometric view of a lower interface between the modular frame of FIG. 1 and an attachment with the attachment connected to the modular frame according to one aspect of the present disclosure.
Figure 6:
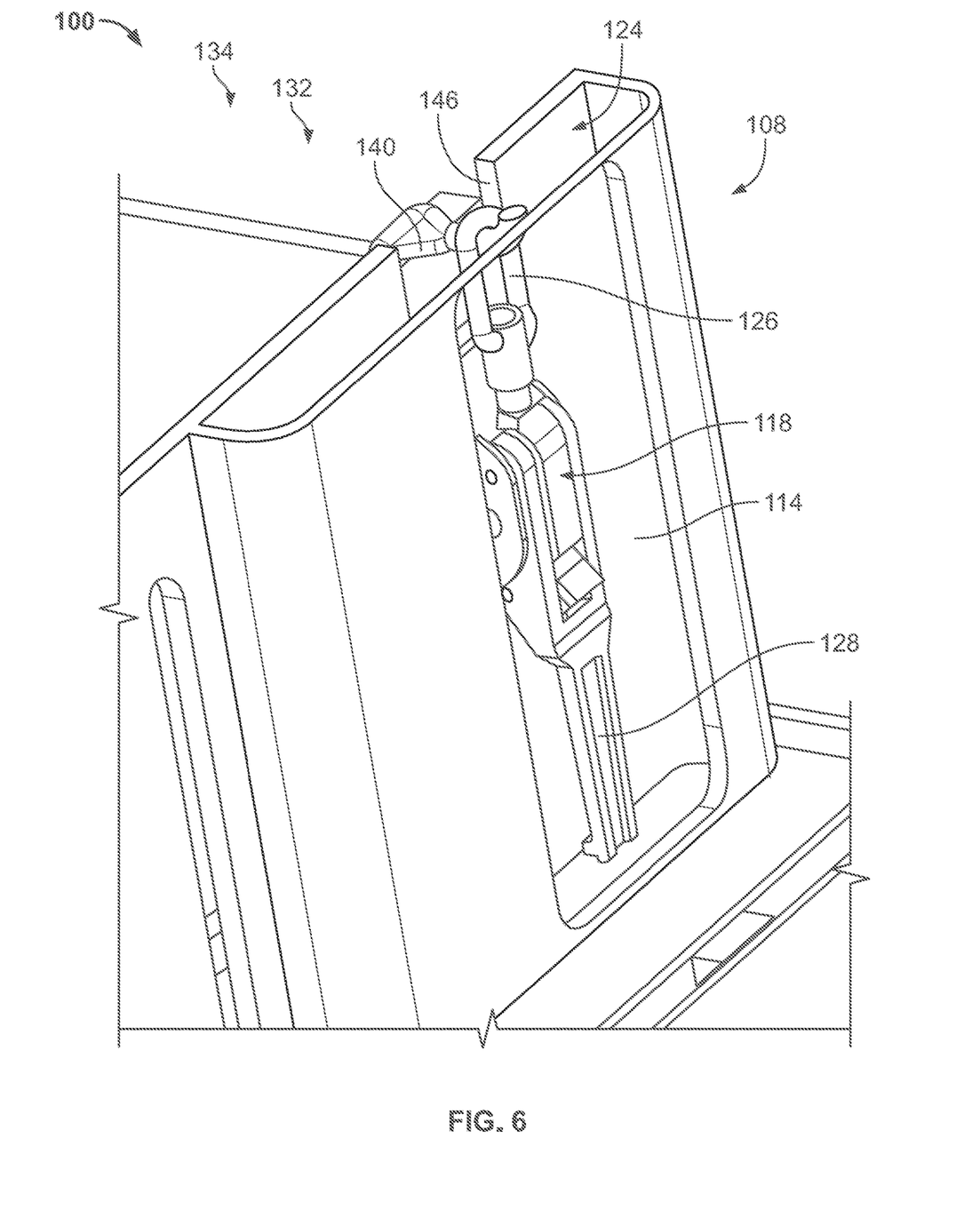
FIG. 6 is a top, front, right isometric view of an upper interface between the modular frame of FIG. 1 and an attachment with the attachment connected to the modular frame according to one aspect of the present disclosure.

When the desired material handling attachment is latched onto the modular vehicle frame 100, the pivot bars 138 sit fully engaged into the pivot blocks 116, which holds the desired material handling attachment firmly to the modular vehicle frame 100, as illustrated in FIG. 5. A locking force provided by the locking latches 118 maintains the pivot bars 138 fully engaged with the pivot blocks 116. In some non-limiting examples, one or more rubber blocks may be arranged on the back end 112 of the modular vehicle frame 100 (e.g., on the first side 120 of the mounting plate 114), which may be compressed between the modular vehicle frame 100 and the desired material handling attachment. Compression of the rubber blocks may provide pressure between the modular vehicle frame 100 and the desired material handling attachment to inhibit loosening of the attachment therebetween.

The modular vehicle frame 100 with a desired material handling attachment quick-connected thereto may form a material handling vehicle configured to perform a desired warehouse application. The desired configuration of the material handling vehicle may be used for the given warehouse application until it is desired to perform another application. To remove the desired material handling attachment from the modular vehicle frame 100, the locking latches 118 are first transitioned from the locked state to the unlocked state (e.g., by pulling up on the arms 128 from the perspective of FIG. 6) and the hooks 140 are then removed from the lock rings 126. The unlocking of the locking latches 118 enables the desired material handling attachment to pivot relative to the modular vehicle frame 100 on the pivot blocks 116. That is, the pivotal interface between the pivot blocks 116 and the pivot bars 138 enables the desired material handling attachment to pivot relative to the modular vehicle frame 100 (e.g., in a forward direction toward the modular vehicle frame 100), once the locking latches 118 are unlocked. As the modular vehicle frame 100 pivots relative to the desired material handling attachment, the back end 112 of the modular vehicle frame 100 may be lowered down (from the direction of FIG. 6) until the support wheels 130 engage the ground, which disengages the pivot bars 138 from the pivot blocks 116. The modular vehicle frame 100 may then be driven out from under the desired material handling attachment and, for example, under another material handling attachment.

In some non-limiting examples, the quick-connection between the mounting assembly 108 and the attachment assembly 132 may be facilitated via a plurality of bolts. In some non-limiting examples, the material handling attachment may be retained to the modular vehicle frame 100 via pins or a threaded coupler. In some non-limiting examples, when the load wheels are integrated into the modular vehicle frame 100, as opposed to the material handling attachment, the material handling attachment may be lifted onto the pivotal blocks 116 prior to locking via the locking latches 118.

In some non-limiting examples, electrical or hydraulic connections may be provided between the modular vehicle frame 100 and the desired material handling attachment. In these non-limiting examples, the electrical and/or hydraulic lines may be connected and disconnected to the modular vehicle frame 100 via quick disconnects.

Figure 7:
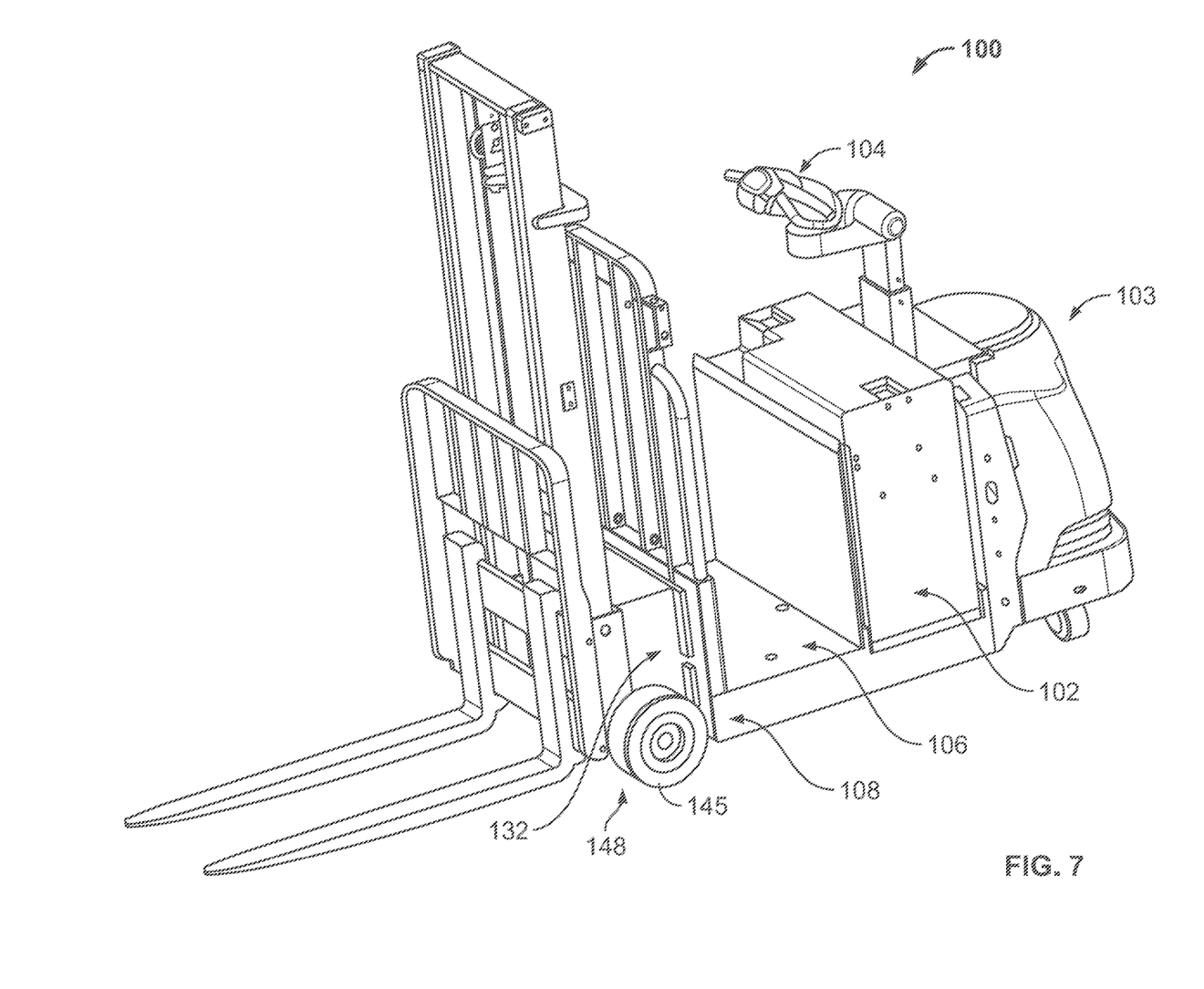
FIG. 7 is a top, back, right isometric view of the modular vehicle frame of FIG. 1 with a stacker mast attachment quick-connected thereto according to one aspect of the present disclosure.
Figure 8:
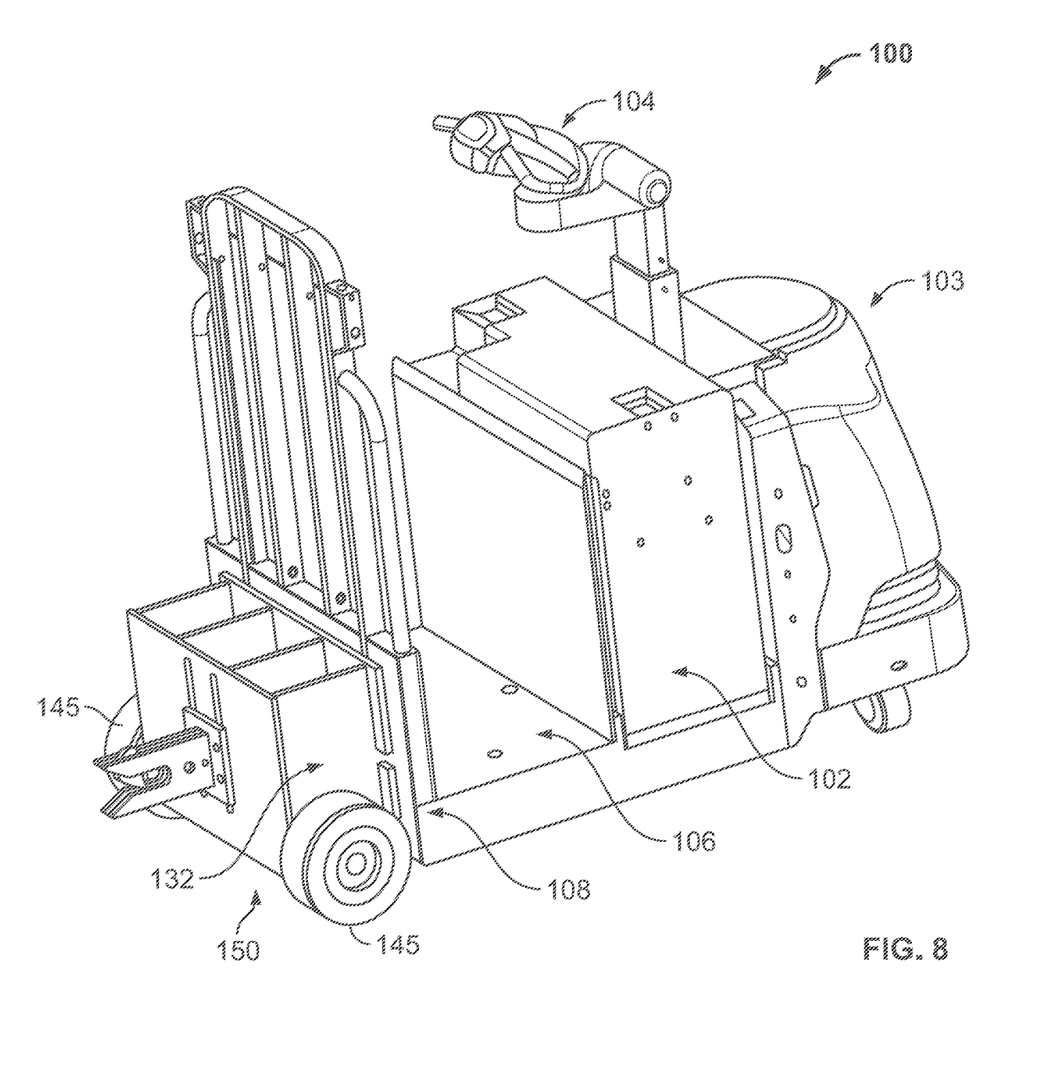
FIG. 8 is a top, back, right isometric view of the modular vehicle frame of FIG. 1 with a tugger attachment quick-connected thereto according to one aspect of the present disclosure.
Figure 9:
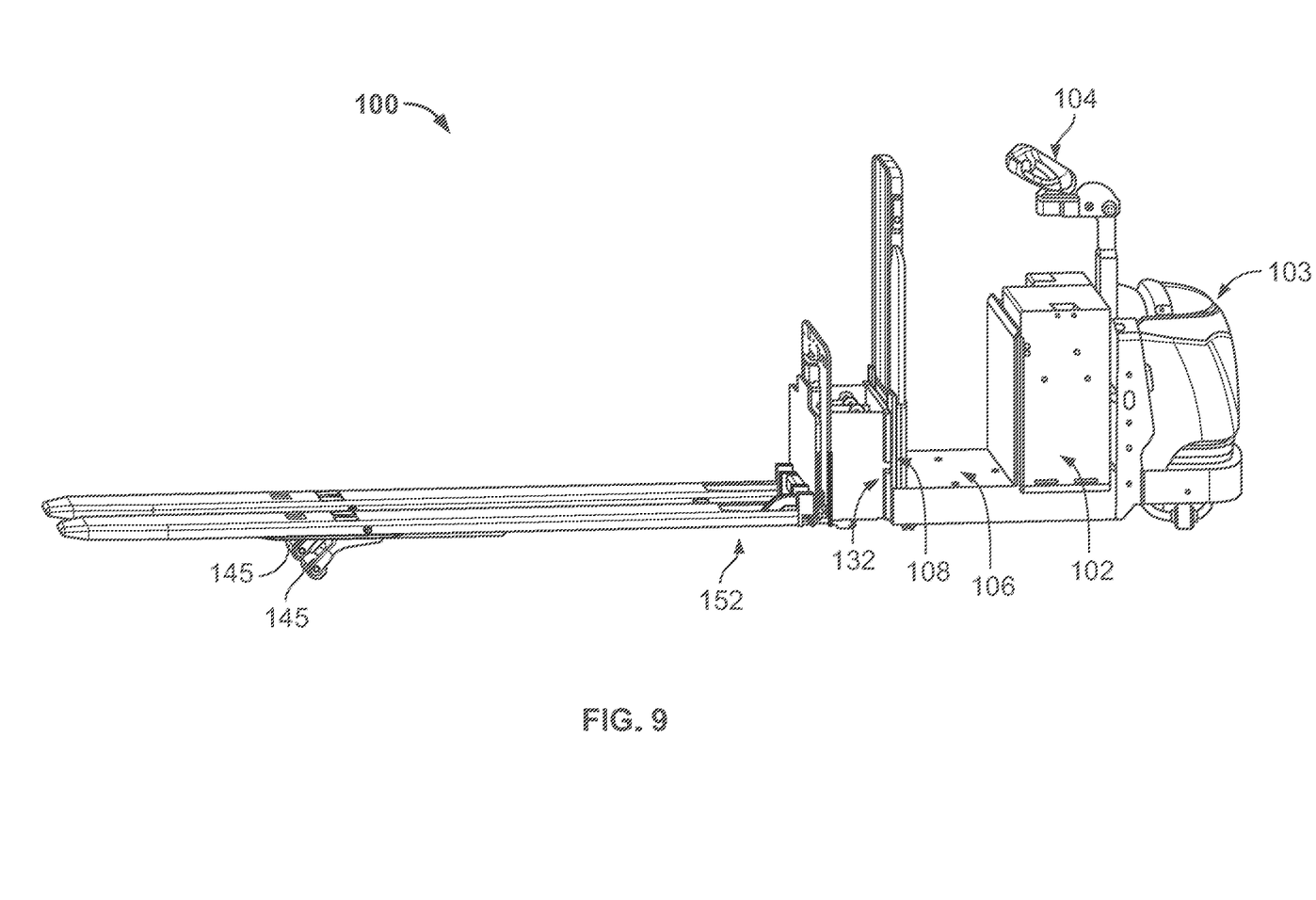
FIG. 9 is a top, back, right isometric view of the modular vehicle frame of FIG. 1 with a pallet fork attachment quick-connected thereto according to one aspect of the present disclosure.

As described herein, the modular vehicle frame 100 may be quick-connected to one of a plurality of different material handling attachments to perform various warehouse tasks using one vehicle frame. FIGS. 7-9 illustrate various non-limiting examples of a material handling attachment that may be quick-connected to the modular vehicle frame 100. For example, as illustrated in FIG. 7, a stacker mast attachment 148 may be selectively quick-connected to the modular vehicle frame 100 to perform stacking tasks within a warehouse. As illustrated in FIG. 8, in some non-limiting examples, a tugger attachment 150 may be selectively quick-connected to the modular vehicle frame 100 to perform towing tasks within a warehouse. As illustrated in FIG. 9, in some non-limiting examples, a pallet fork attachment 152 may be selectively quick-connected to the modular vehicle frame 100 to perform load transporting tasks within a warehouse.

The selective quick-connection to the various material handling attachments 148, 150, and 152 enable one of the modular vehicle frames 100 to satisfy what would normally require a plurality of different material handling vehicles. The use of various material handling attachments on a single modular vehicle frame 100 may be less expensive than purchasing different material handling vehicles for different applications, and require less warehouse space for storage.

The quick-connection between the modular vehicle frame 100 and one of the material handling attachments 148, 150, and 152 provided by the mounting assembly 108 and the attachment assembly 132 enable the quick and easy selective changing of the installed material handling attachment, for example, by a single operator without a need for special tools. In some non-limiting examples, a locking feature on the locking latches 118 may ensure that the locking latches 118 remain in the locked state during operation. In some non-limiting examples, the adjustability of the locking latches 118 may enable the latching force, or pressure between the desired material handling attachment and the modular vehicle frame 100, to be adjusted over time.

Figure 10:
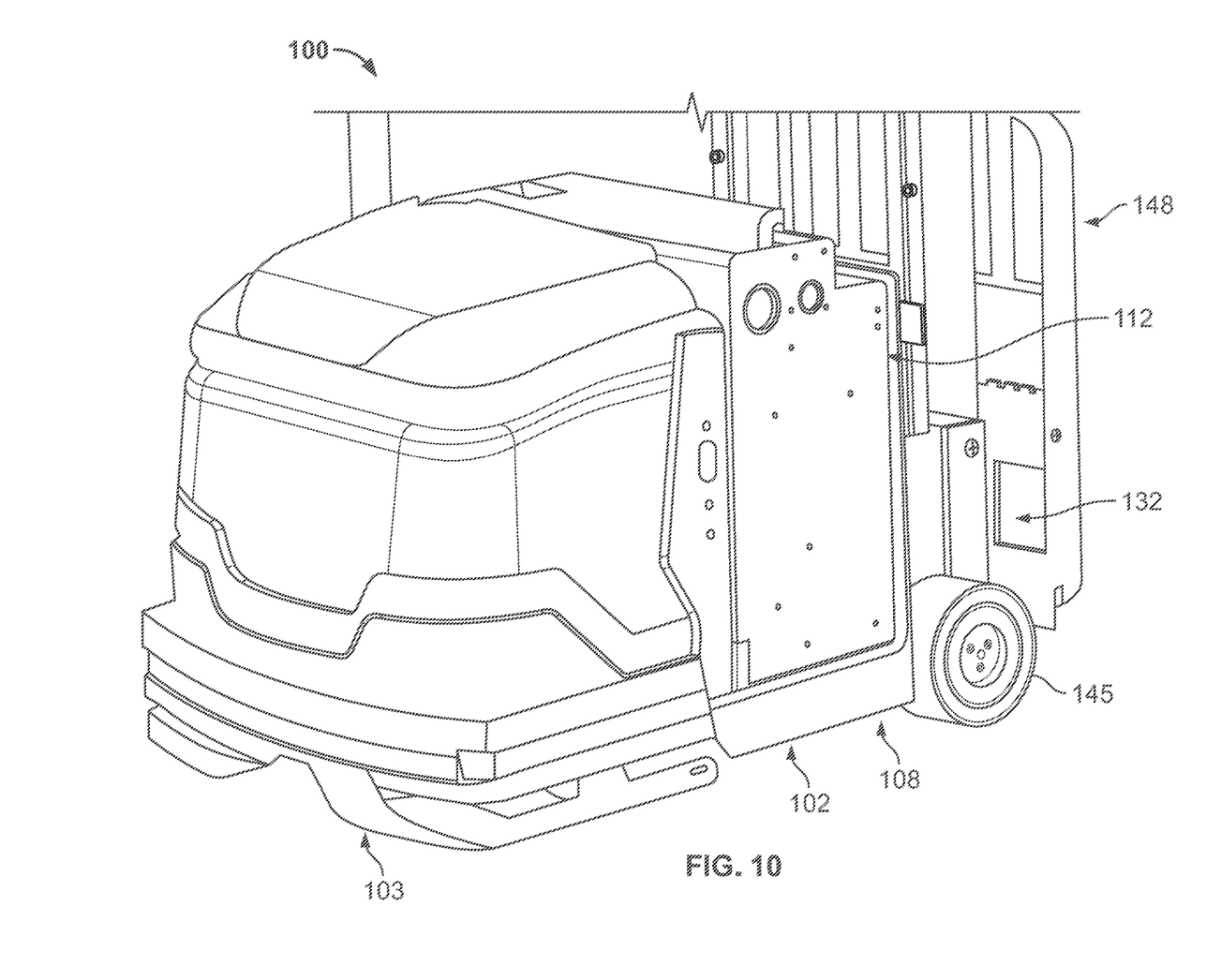
FIG. 10 is a top, front, left isometric view of an autonomously guided material handling vehicle including a modular vehicle frame without an operator compartment and a stacker mast attachment quick-connected thereto according to one aspect of the present disclosure.

As described herein, the modular vehicle frame 100 may be provided without the operator compartment 106. FIG. 10 illustrates a non-limiting example of the modular vehicle frame 100 without the operator compartment 106. For example, as illustrated in FIG. 10, the modular vehicle frame 100 may be utilized as an AGV with the stacker attachment 148 selectively quick-connected thereto. In the illustrated non-limiting example, the stacker attachment 148, including the attachment assembly 132, may be coupled to the back end 112 of the battery compartment 102. Alternatively or additionally, the modular vehicle frame 100 may be removably attached to the handle 104. In these non-limiting examples, the handle 104 may be used to train routes for the AGV, but then may be removed and used universally throughout a warehouse.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A modular vehicle frame for a material handling vehicle, the modular vehicle frame comprising:
   a battery compartment;
   a handle configured to control a speed and direction of a traction wheel; and
   a mounting assembly configured to selectively quick-connect to a material handling attachment, the mounting assembly including:
   a mounting plate having a first side and a second side;
   a pair of laterally-spaced pivot blocks each extending from a bottom of the first side of the mounting plate and configured to provide a pivotal interface with the material handling attachment, wherein each of the pivot blocks includes a concave top surface that defines a generally rounded profile; and
   at least one locking latch attached to the second side of the mounting plate and configured to provide a selective locking interface with the material handling attachment.

2. The modular vehicle frame of claim 1, wherein the handle is removably attached to the modular vehicle frame.

3. The modular vehicle frame of claim 2, wherein the handle is configured to remotely control the speed and direction of the traction wheel.

4. The modular vehicle frame of claim 3, wherein the modular vehicle frame is integrated into an autonomously guided material handling vehicle.

5. The modular vehicle frame of claim 1, wherein the at least one locking latch comprises two locking latches laterally spaced and attached to a top of the second side of the mounting plate.

6. The modular vehicle frame of claim 5, wherein each of the locking latches includes a lock ring and an arm.

7. The modular vehicle frame of claim 6, wherein the arms are configured to be selectively manipulated to transition the locking latches between a locked state and an unlocked state.

8. The modular vehicle frame of claim 1, further comprising at least one support wheel arranged under the mounting assembly.

9. The modular vehicle frame of claim 8, wherein when the material handling attachment is quick-connected to the mounting assembly, the at least one support wheel is configured to be raised above ground on which the modular vehicle frame is configured travel, and when the material handling attachment is disconnected from the mounting assembly, the at least one support wheel is configured to engage the ground.

10. A material handling vehicle comprising:
    a modular vehicle frame including:
      a battery compartment;
      a handle configured to control a speed and direction of a traction wheel; and
      a mounting assembly configured to selectively quick-connect to a material handling attachment, the mounting assembly including:
        a mounting plate having a first side and a second side; and
        at least one pivot block extending from the first side of the mounting plate and configured to provide a pivotal interface with the material handling attachment;
        a pair of laterally-spaced locking latches each attached to a top of the second side of the mounting plate and each configured to provide a selective locking interface with a material handling attachment, wherein each of the locking latches includes a lock ring and an arm, and wherein the arms are configured to be selectively manipulated to transition the locking latches between a locked state and an unlocked state; and
    wherein the material handling attachment includes an attachment assembly configured to selectively quick-connect to the mounting assembly of the modular vehicle frame.

11. The material handling vehicle of claim 10, wherein the at least one pivot block comprises two pivot blocks laterally spaced and extending from a bottom of the first side of the mounting plate.

12. The material handling vehicle of claim 11, wherein each of the pivot blocks includes a concave top surface that defines a generally rounded profile.

13. The material handling vehicle of claim 12, wherein the attachment assembly includes:
    an attachment plate having a first side and a second side;
    at least one pivot bar configured to provide a pivotal interface with the modular vehicle frame; and
    at least one hook configured to provide a selective locking interface between the material handling attachment and the modular vehicle frame.

14. The material handling vehicle of claim 13, wherein the at least one pivot bar comprises two pivot bars laterally spaced apart and arranged adjacent to a bottom of the first side of the attachment plate.

15. The material handling vehicle of claim 14, wherein the at least one hook comprises two hooks laterally spaced apart and arranged on a top side of the attachment plate.

16. The material handling vehicle of claim 15, wherein the pivot bars are configured to engage the concave top surfaces of the pivot blocks to provide a pivotal interface between the modular vehicle frame and the material handling attachment.

17. The material handling vehicle of claim 15, wherein the hooks are configured to extend through the lock rings of the locking latches and the arms are configured to transition between the locked state and the unlocked state to provide a selective locking interface between the modular vehicle frame and the material handling attachment.

18. The material handling vehicle of claim 10, wherein the material handling attachment comprises a stacker attachment.

19. The material handling vehicle of claim 10, wherein the material handling attachment comprises a tugger attachment.

20. The material handling vehicle of claim 10, wherein the material handling attachment comprises a pallet fork attachment.

21. The material handling vehicle of claim 10, further comprising at least one support wheel arranged under the mounting assembly.

22. The material handling vehicle of claim 21, wherein when the material handling attachment is quick-connected to the mounting assembly, the at least one support wheel is configured to be raised above ground on which the modular vehicle frame is configured to travel, and when the material handling attachment is disconnected from the mounting assembly, the at least one support wheel is configured to engage the ground.

23. The material handling vehicle of claim 10, wherein the handle is removably attached to the modular vehicle frame.

24. The material handling vehicle of claim 23, wherein the handle is configured to remotely control the speed and direction of the traction wheel.

25. The material handling vehicle of claim 24, wherein the modular vehicle frame is integrated into an autonomously guided material handling vehicle.

26. A material handling vehicle comprising:
   a modular vehicle frame including:
      a battery compartment;
      a handle configured to control a speed and direction of a traction wheel; and
      a mounting assembly including at least one support wheel arranged under the mounting assembly; and
   a material handling attachment including:
      an attachment assembly configured to selectively quick-connect to the mounting assembly of the modular vehicle frame
      wherein when the material handling attachment is quick-connected to the mounting assembly, the at least one support wheel is configured to be raised above ground on which the modular vehicle frame is configured to travel, and when the material handling attachment is disconnected from the mounting assembly, the at least one support wheel is configured to engage the ground.

* * * * *